United States Patent

Ofer et al.

Patent Number: 5,887,199
Date of Patent: Mar. 23, 1999

[54] MASS STORAGE CONTROLLER WITH UNIVERSAL TRACK SIZE ADAPTABILITY

[75] Inventors: Erez Ofer; Natan Vishlitzky, both of Brookline, Mass.

[73] Assignee: EMC Corporation, Hopkinton, Mass.

[21] Appl. No.: 660,226

[22] Filed: Jun. 3, 1996

[51] Int. Cl.$^6$ .................................................. G06F 13/00
[52] U.S. Cl. ........................................... 395/885; 395/888
[58] Field of Search ............................... 369/13; 395/404, 395/441, 888, 885, 182.04; 711/4, 114, 112; 360/48

[56] References Cited

U.S. PATENT DOCUMENTS

| | | | |
|---|---|---|---|
| 5,237,675 | 8/1993 | Hannon, Jr. | 395/888 |
| 5,321,673 | 6/1994 | Okazaki | 369/13 |
| 5,367,652 | 11/1994 | Golden et al. | 711/4 |
| 5,367,669 | 11/1994 | Holland et al. | 395/182.5 |
| 5,455,934 | 10/1995 | Holland et al. | 711/4 |
| 5,524,204 | 6/1996 | Verdoorn, Jr. | 395/182.04 |
| 5,550,684 | 8/1996 | Shih et al. | 360/48 |
| 5,574,907 | 11/1996 | Jernigan, IV et al. | 711/112 |
| 5,592,648 | 1/1997 | Schultz et al. | 711/114 |

OTHER PUBLICATIONS

Schmidt, R.L., "A memory control chip for formating data into blocks suitable for video coding applications", IEEE, pp. 1275–1280, Oct. 1989.

Malluhi et al., "Approaches for a reliable high–performance distributed–parallel storage system", IEEE Comput. Soc. Press, pp. 500–509, Aug. 8, 1996.

*Primary Examiner*—Wayne Amsbury
*Assistant Examiner*—Thuy Pardo
*Attorney, Agent, or Firm*—Fish & Richardson P.C.

[57] ABSTRACT

A mass storage array, having a plurality of mass storage drives, is flexible and adaptable to receive data blocks of a preselected varying size and, using an initialization process, adapts itself for writing the data blocks to disk drives having a known physical congfiguration. The disk storage system is software initialized to enable it to receive, from a host computer, data blocks having one of a selected number of possible block sizes. The disk storage system then, under software control, reformats the data to the particular configuration and physical block size of the disk drives attached to it. Thus, in one example, data blocks having 504 bytes per block, available from a Unisys mainframe computer, can be formatted and stored in disk drives having a block size of 512 bytes per block in a manner transparent to the user. In other configurations, a software configuration for the same physical storage controller and disk array takes data blocks from a Unisys Series A System having a data block size of 180 bytes per block, and groups them so that eight incoming computer formatted 180 byte blocks are stored in three physical blocks on the disk drive system.

11 Claims, 2 Drawing Sheets

| SYSTEM | HOST BLOCK SIZE | DISK BLOCK SIZE | PACKING |
|---|---|---|---|
| UNISYS A SERIES | 180 | 512 | YES |
| UNISYS MAIN FRAME | 504 | 512 | YES |
| UNIX | 512 | 512 | NO |
| AS/400 | 520 | 520 | NO |

MASS STORAGE CONTROLLER WITH UNIVERSAL TRACK SIZE ADAPTABILITY

BACKGROUND OF THE INVENTION

The invention relates generally to mass storage systems, and in particular, to the communications for, and configuration of, a mass storage system.

To meet the growing requirements of today's computer systems, and simultaneously, to achieve flexibility and reliability in the function and configuration of a mass storage system, manufacturers of such systems have needed to make their systems adaptable to differing host standards. However, it would be desirable to manufacture the same mass storage system for use with the differing standards associated with various host computer manufacturers.

One particular area in which the standards have clearly not been consistent is the data block structure with which a host computer system formats its data. Thus, in a Unisys Series A system, for example, each block has 180 bytes of data whereas in an IBM AS/400 system, each block has 520 bytes of data. Other system configurations, such as those using the Unix operating system, require 512 bytes of data per block (the defacto standard). In addition, there can be one or more bytes of error correcting code or parity as required by the host system.

In modern high speed, high capacity systems, the host system does not perform the actual storage of the data on or in the mass storage device. This is left to a sophisticated storage controller which receives the blocks of data and formats them for storage in view of the physical characteristics of a disk drive.

Most disk drive manufacturers configure their disk drives for 512 bytes of data per block, with a plurality of blocks forming a track. (Those made for compatibility with IBM equipment such as the AS/400, use 520 bytes per block.) Each drive contains a plurality of tracks to form a cylinder. It is necessary in accordance with prior art systems to configure the physical disk drive, at the factory, for differing protocols, and thus create drives which cannot be used for any other block size protocol without being returned to the factory.

SUMMARY OF THE INVENTION

In accordance with the invention, a mass storage system features a mass storage array having a plurality of mass storage disk drives, the disk drives having a preselected physical configuration. The invention further features a disk drive controller for receiving and sending data from and to the disk drives in a logical format configuration compatible with the physical configuration, the disk drive controller also sending and receiving data and commands to and from a host communications channel. The disk drive controller further, in response to format identification initialization commands, preferably a software command, configures itself to reformat incoming data blocks, having a selected host format configuration, to a logical disk format configuration compatible with the physical drive format.

In preferred embodiments of the invention, the physical format configuration can have, for example, 512 or 520 bytes per block, while the incoming data blocks have, for example, 180, 504, 512 or 520 bytes per block.

BRIEF DESCRIPTION OF THE DRAWINGS

Other features and advantages of the invention will be apparent from the following description together with the drawings in which.

DESCRIPTION OF THE PREFERRED EMBODIMENTS

Figure 1:
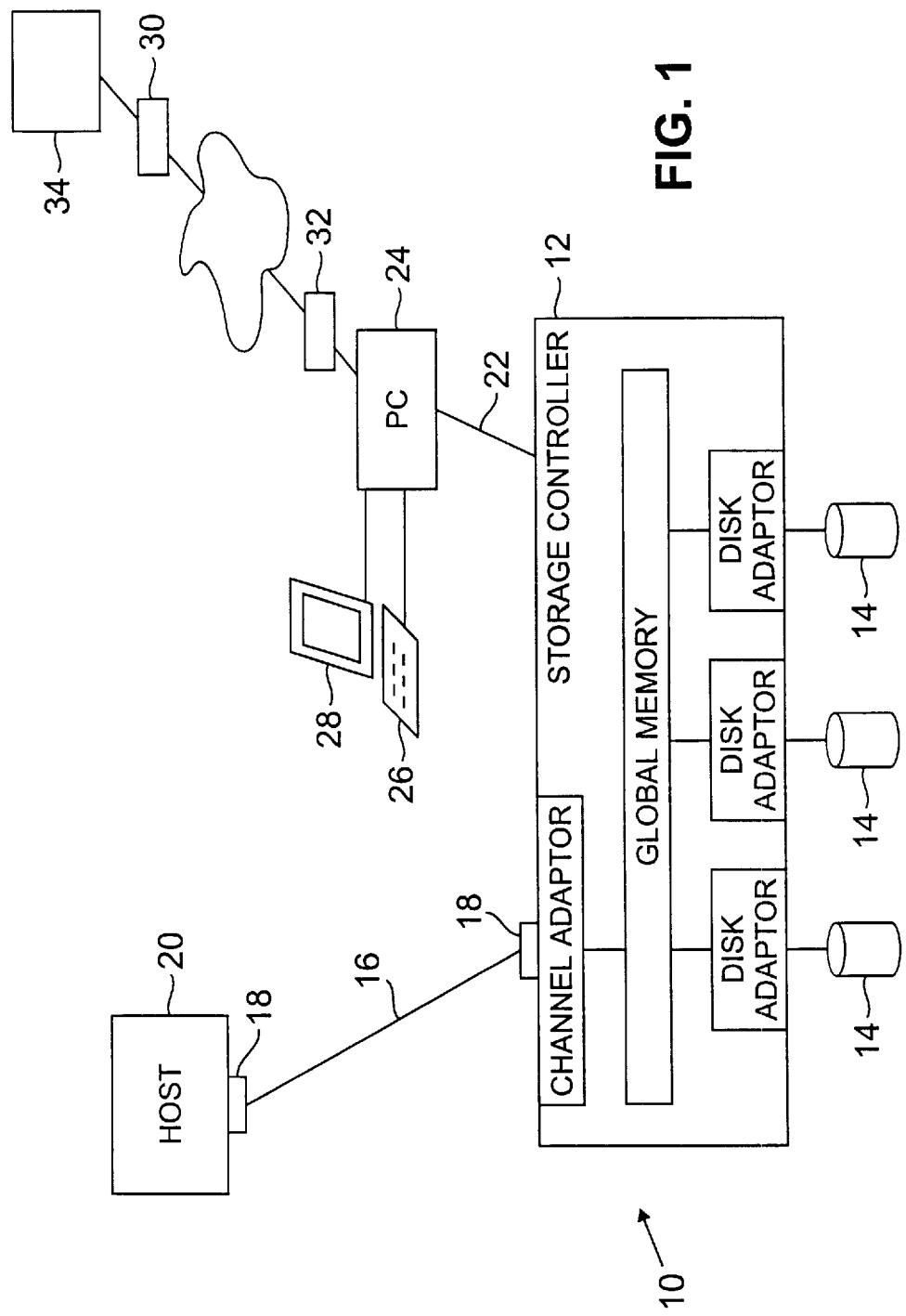
FIG. 1 is a block diagram of a mass storage system in accordance with the invention.

Referring to FIG. 1, in a typical mass storage configuration, a storage system 10 has a storage controller 12 connecting to a plurality of disk drive elements 14. The disk drive elements are collectively controlled by the storage controller, and may be of any size, however for certain configurations it is preferred that the drives be of a similar size. Disk drives 14 may be for example as large as 2.3 gigabytes or more.

The storage controller 12 connects over a communications path 16, connected through terminator elements 18, to a host computer 20. The communications path can be for example a SCSI bus and the host computer 20 can be a server, a main frame computer, or a work station having a display and keyboard. Storage controller 12 also connects over a communications path 22 to a personal computer (PC) 24. PC 24 is typically operated either on site through a keyboard 26 and display 28, or from a remote service site 34 over a communications network, such a telephone network, through modem elements 30 and 32.

The disk drives 14, while being characterized as having a so-called capacity in terms of the number of bytes each can store, are divided both physically and logically into a plurality of elements. Logically, these elements, called logical volumes, may be split by the storage controller across a number of disk drives, as is used in some forms of RAID, or one or more logical volumes can be found on a single disk drive element 14. The interconnection and access which a host has to a logical volume is set by the storage controller 12 which may be, for example, an EMC Corporation Symmetrix storage controller.

As noted above, different host computers, depending upon their manufacturer, operate in accordance with different protocols. In particular, when writing to a mass storage device, the host computer will block the data, however, the size of the blocks will vary depending upon both the particular protocol being used and the manufacturer. For example, a Unisys A series system will block the data into groups of 180 bytes per block. An IBM based system such as the AS/400 will block the data into blocks of 520 bytes. Other systems such as those using a Unix operating system operate according to what is generally considered the standard block size of 512 bytes. In addition, each of the blocks has an appropriate number, typically 8, of error correcting bytes within which are stored, for example, parity and error correcting code values.

The disk drive elements 14, on the other hand, are today typically physically configured to "expect" a data block size of 512 bytes. Since some of the blocks which it will receive, under ordinary circumstances, have more, or less than 512 bytes, certain problems can occur. In perhaps a worse case scenario, if each logical block from the host computer is to be stored in a physical disk drive block, substantial wastage can be seen when for example a 180 byte block is stored in a 512 byte block space at the disk drive. In accordance with this difficulty and wastage, and in accordance with the invention, a method is provided for initiating at start-up, a software configuration setup, for "packaging" the data so as to improve the efficiency of storage when byte sizes other than a standard byte size of 512 bytes are employed.

Figures 2, 3:
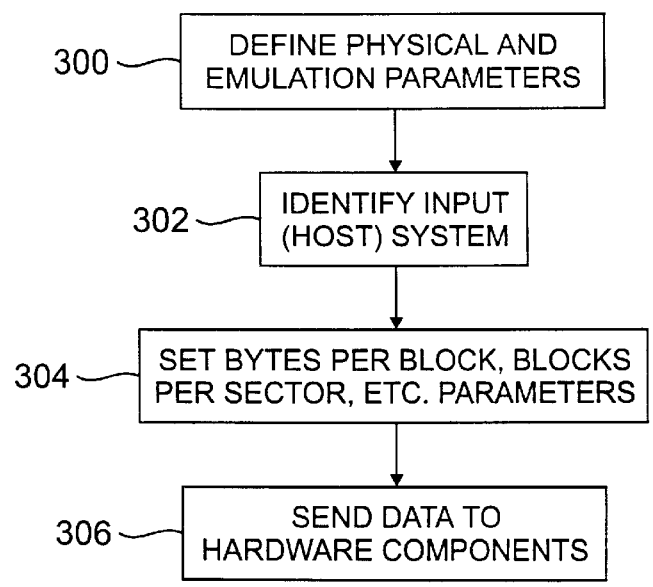
FIG. 2 is a table illustrating the operation of the storage controller illustrated in FIG. 1.
FIG. 3 is a flow chart illustrating operation of the controller according to the invention.

Referring now to FIG. 2, in accordance with the invention, the disk drive or disk drives have, based on manufacturing specifications, typically either 512 or 520 bytes per block. Other physical parameters associated with the disk drives include the number of blocks per sector, the number of sectors per track, and the number of tracks per cylinder. These physical parameters are immutable.

While varying formats could, according to the invention, be written to the disks, there are typically four primary block sizes of interest: Unisys, in its server configuration, operates at 180 bytes per block, and in a main frame configuration, at 504 bytes per block. The UNIX operating system, acting as a standard, has 512 bytes per block and IBM, for example in its AS/400 system, operates at 520 bytes per block. These all relate to a block size from the host computer to the storage controller. The physical disk drive is, typically, either 512 or 520 bytes per block. Clearly, for use with the AS/400, the disk drives should have a physical size of 520 bytes per block.

In accordance with the invention, the logical size of a block which the controller expects to receive, which occurs at the "front end" of the disk controller operation, is set at initialization of the system, while the physical size of the block actually stored on the drive corresponds to the "back end" of the disk controller. In accordance with the invention, the initialization process uses a single module of software code to enable the flexible size settings to be entered into the system which thereby enables the system to properly format the incoming data blocks for a correct presentation to the physical drives. The software thus initialized causes the incoming data stream to be properly handled and formatted for the particular disk drive. For example, in the event the system is operating with a Unisys A series device having 180 bytes per block, it will handle those 180 bytes per block in a manner so as to provide 8 Unisys blocks for each three (512 byte) blocks on disk, padding the blank space of the disk blocks with either error correction data and/or zeros. Similarly, for a Unisys main frame having 504 bytes per block, the system will add eight additional bits to each Unisys block to fill out a standard 512 byte block for the disk storage array, the eight bits being used for either error correction or in other instances as merely fill. It is only for a block size such as is found in the IBM AS/400, with its 520 bytes per block, that a physical disk block size of 520 bytes per block is required. The system will not, in a preferred embodiment of the invention, allow the 520 bytes per block AS/400 protocol to be used with a 512 bytes per block disk storage device.

Referring to the flow chart of FIG. 3, a preferred implementation of the invention includes an initialization program which provides initialization of the various parameters such as EMUL_BLK_SIZE, (A0) (the emulation block size); EMULATION (A0) (the emulation bit corresponding to Unisys); PH_NE_EMUL and DV_CHAR (A0) (indicating that the emulation sector size is different than a standard physical sector size); PH_BLK_SIZE (A0) (the physical block size); BLKS_PER_SEC(A0) (the number of emulation blocks per sector); PH_BLKS_PER_SEC (A0) (the number of physical blocks per sector) and SECTORS_PER_TRK(A0) (the number of sectors per track).

Thus, referring to FIG. 3, the storage controller first defines the physical and emulation parameters noted above, and other parameters necessary to define the physical and emulation block sizes for the system being addressed. This is indicated at 300. Next, the disk controller requires an identification of the input system, that is, whether it is an Usisys type system, a Unix based system, an IBM based system, etc. This is indicated at 302. After identifying the nature of the input system, and knowing the parameters for the disk drives to which blocked data will be directed, the controller proceeds at 304, in software, to derive the various physical and emulation values for the bytes per block, blocks per sector, sectors per track, etc. for those devices to which the controller is attached. Care is taken with regards specifically to CKD and the Unisys A series input since those inputs in one instance require a larger block size than is standard (the AS/400) and on the other hand cause the parameters to dictate the eight logical blocks to three physical blocks mapping which the controller will effect when the Unisys A series input is encountered.

As a result, once the parameters are properly determined, they are provided at 306 to the disk adaptors in order to enable the disk adaptor, when reading data from global memory, to properly format the data and provide any necessary "filler" and/or error correcting code bits in writing to the disk drives. Similarly, when reading from the disk drives, these same parameters enable the disk adaptor to properly convert from the format used on the disk drive to the format expected by the host computer. While the particular emulation software described herein enables a single disk storage device to emulate the necessary parameters for a number of specific and described host systems, it is neither necessary nor required that all of the identified host systems be used nor is it necessarily desirable that other host systems having different numbers of bytes per block be added to the emulation process. Accordingly, a single storage system can be adapted by software initialization to handle a number of different hosts and thereby a single system can be manufactured with substantial flexibility and adaptability, all under software control.

Additions, subtractions, and other modifications of the preferred embodiment of the invention will be apparent to those practiced in this field and are within the scope of the following claims:

What is claimed is:

1. A mass storage system comprising:
   a mass storage array having a plurality of mass storage disk drives, each disk drive having a physical configuration,
   a disk drive controller for receiving and sending data from and to said disk drives in a logical format configuration compatible with said physical configuration,
   said disk drive controller sending and receiving data and commands to and from a host/controller communications channel, and
   said disk drive controller in response to format identification commands from the host/controller communications channel, configuring itself to reformat incoming data blocks having a host format configuration to the logical disk format configuration compatible with the physical configuration.

2. The mass storage system of claim 1 wherein said logical format configuration has 512 bytes per block and said incoming data blocks are 180 bytes per block.

3. The mass storage system of claim 1 wherein said logical format configuration has 520 bytes per block and said incoming data blocks have 512 bytes per block.

4. The mass storage system of claim 1 wherein said logical format configuration has 504 bytes per block and said incoming data blocks have 512 bytes per block.

5. A method for storing data on a mass storage array having a plurality of mass storage disk drives, each disk drive having a physical configuration, comprising the steps of receiving and sending data from and to said disk drives in a logical format configuration compatible with said physical configuration, sending and receiving data and commands at the disk drive controller to and from a host/controller communications channel, and in response to format identification commands, reformatting incoming data blocks having a host format configuration to the logical disk format configuration compatible with the physical configuration.

6. The method of claim 5 wherein said logical format configuration has 512 bytes per block and said incoming data blocks have 180 bytes per block.

7. The method of claim 5 wherein the logical format configuration has 520 bytes per block and the incoming data blocks have 512 bytes per block.

8. The method of claim 5 wherein the said logical format configuration has 504 bytes per block and the incoming data blocks have 512 bytes per block.

9. A method for storing data on a mass storage array having a plurality of mass storage disk drives, each disk drive having a physical configuration, comprising the steps of receiving and sending data from and to said disk drives in a logical format configuration compatible with said physical configuration, sending and receiving data and commands at the disk drive controller to and from a host/controller communications channel, in response to format identification commands, reformatting incoming data blocks having a host format configuration to the logical disk format configuration compatible with the physical configuration, said logical format configuration has 512 bytes per block and said incoming data blocks have 180 bytes per block, and grouping said incoming data blocks whereby eight incoming data blocks are stored in three physical blocks on the disk drive.

10. The method of claim 9 further wherein said reformatting step comprises adding a plurality of filler bytes to make the format configuration and logical disk format configuration identical in length.

11. The method of claim 10 wherein said filler bytes include error correcting information.

* * * * *